Figure 1:
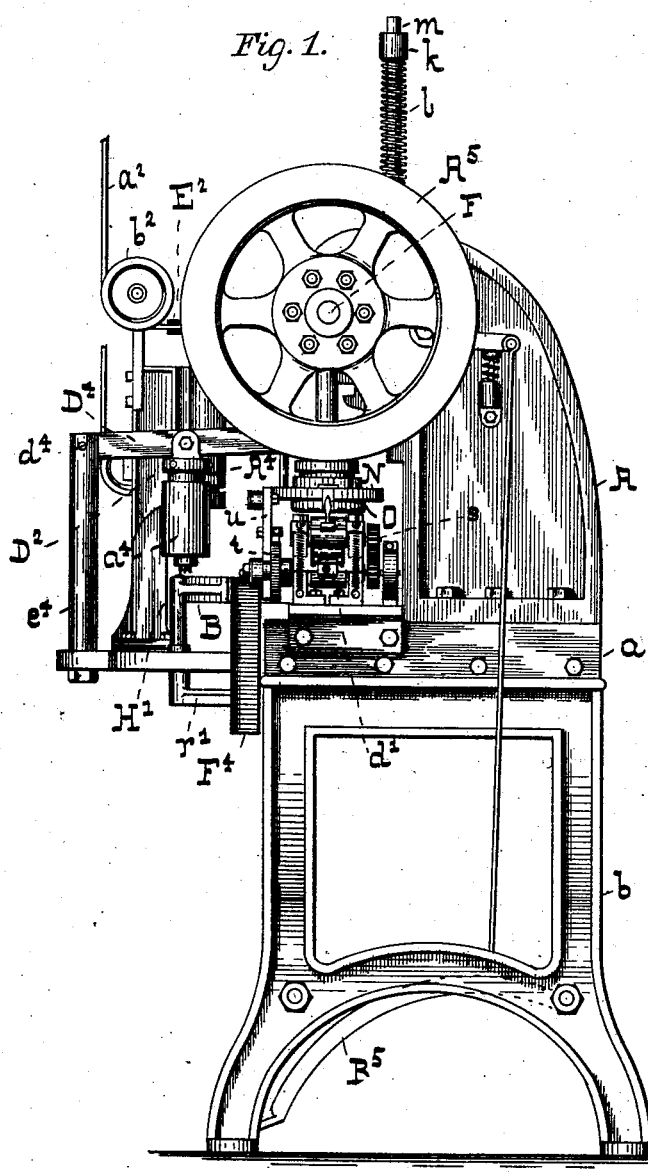

No. 697,489. Patented Apr. 15, 1902.
A. JONES.
MACHINE FOR PRODUCING BOTTLE SEALING CAPS.
(Application filed May 31, 1898.)
(No Model.) 7 Sheets—Sheet 1.

WITNESSES
Dan'l Fisher
H. Constantine

INVENTOR
Albert Jones,
by Geo. W. T. Howard,
atty.

No. 697,489. Patented Apr. 15, 1902.
A. JONES.
MACHINE FOR PRODUCING BOTTLE SEALING CAPS.
(Application filed May 31, 1898.)
(No Model.) 7 Sheets—Sheet 2.

No. 697,489. Patented Apr. 15, 1902.
A. JONES.
MACHINE FOR PRODUCING BOTTLE SEALING CAPS.
(Application filed May 31, 1898.)
(No Model.) 7 Sheets—Sheet 3.

WITNESSES  
Dan'l Fisher  
H. Constantine

INVENTOR  
Albert Jones,  
by Geo. W. T. Howard,  
Attys.

No. 697,489. Patented Apr. 15, 1902.
A. JONES.
MACHINE FOR PRODUCING BOTTLE SEALING CAPS.
(Application filed May 31, 1898.)
(No Model.) 7 Sheets—Sheet 4.
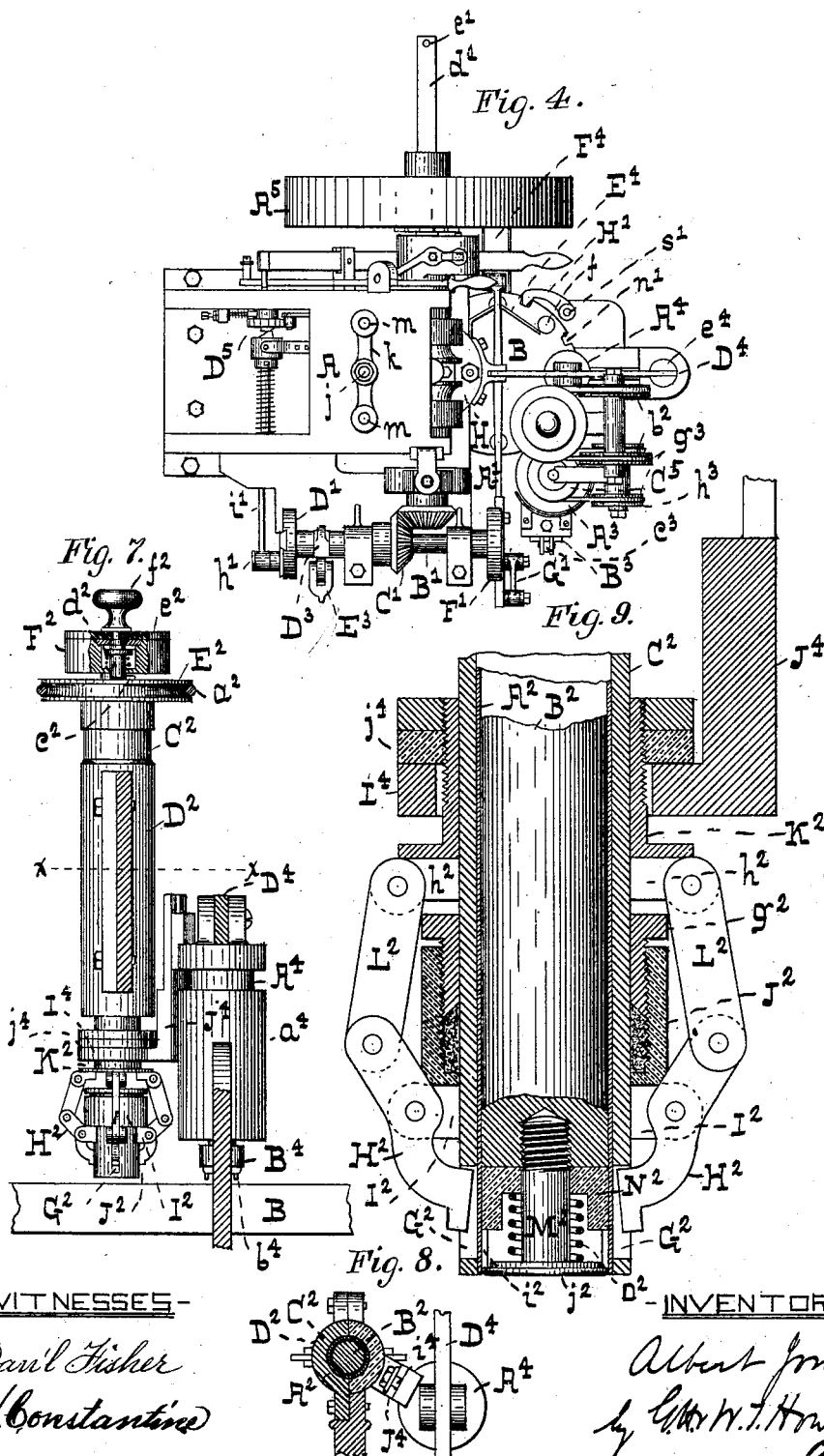

No. 697,489. Patented Apr. 15, 1902.
A. JONES.
MACHINE FOR PRODUCING BOTTLE SEALING CAPS.
(Application filed May 31, 1898.)
(No Model.) 7 Sheets—Sheet 5.
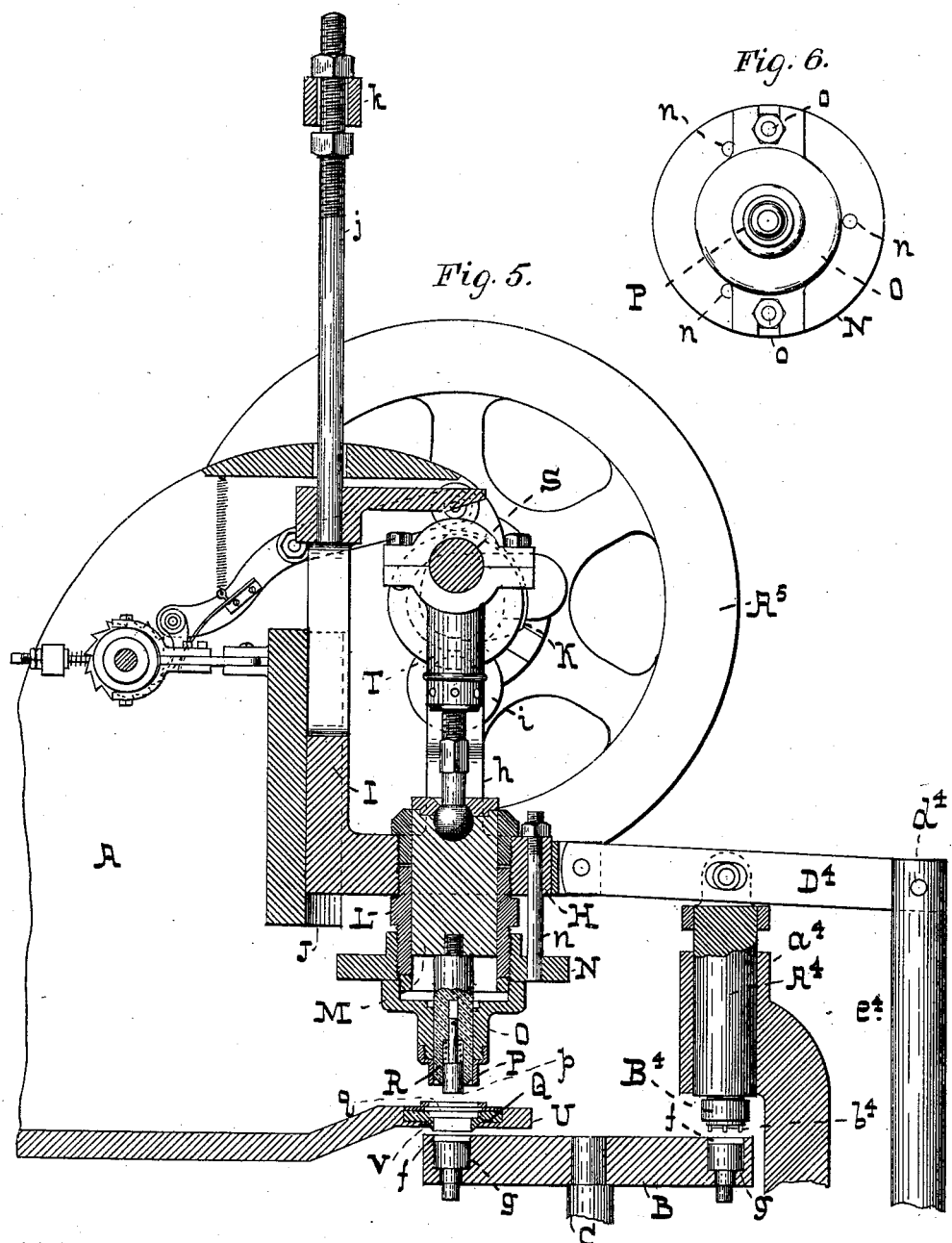
WITNESSES
Dan'l Fisher
H. Constantine
INVENTOR
Albert Jones,
by G.H. & W.J. Howard,
attys.

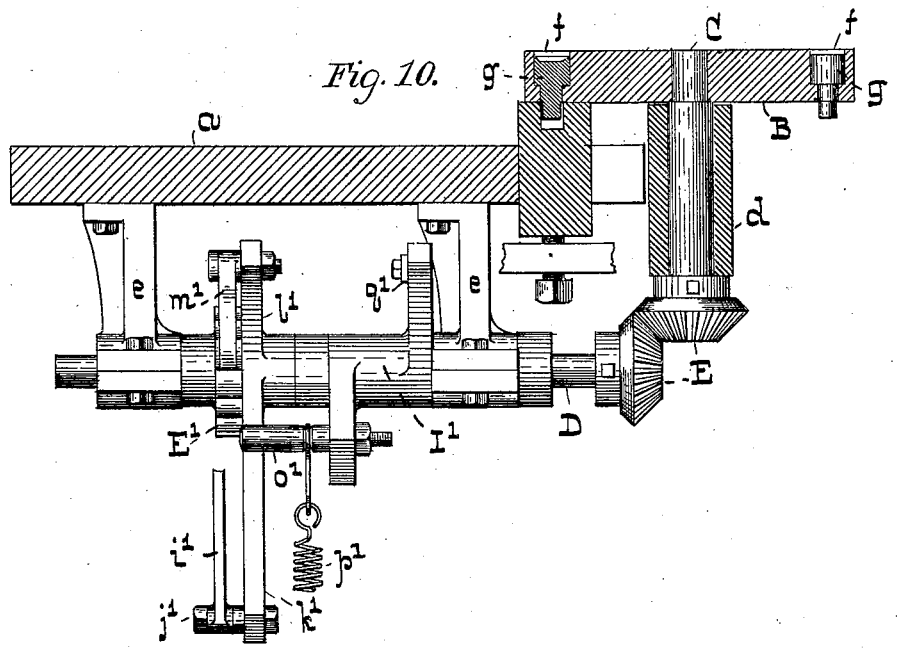

No. 697,489. Patented Apr. 15, 1902.
A. JONES.
MACHINE FOR PRODUCING BOTTLE SEALING CAPS.
(Application filed May 31, 1898.)
(No Model.) 7 Sheets—Sheet 7.
Fig. 19.
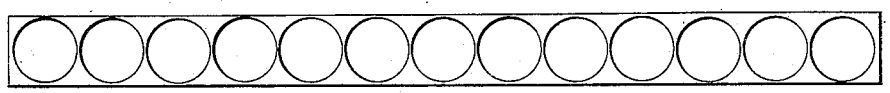
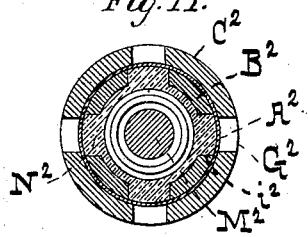
Fig. 11.
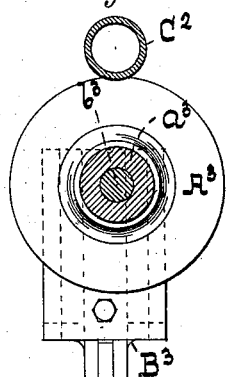
Fig. 13.
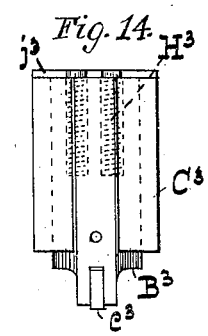
Fig. 14.
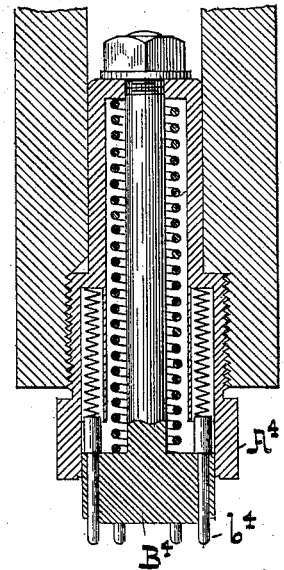
Fig. 12.
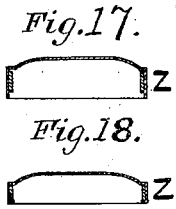
Fig. 17.
Fig. 18.
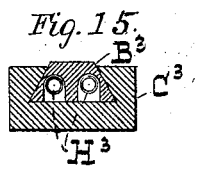
Fig. 15.
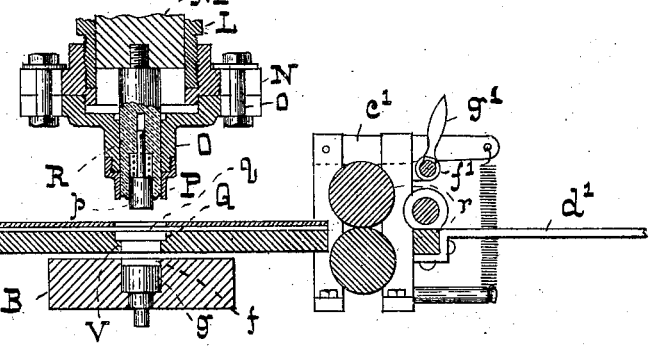
Fig. 16.
-WITNESSES- -INVENTOR-
Dan'l Fisher Albert Jones,
H. Constantine. by G.H. & W.T. Howard,
Attys.

UNITED STATES PATENT OFFICE.

ALBERT JONES, OF BALTIMORE, MARYLAND, ASSIGNOR TO LEWIS KALLING, OF BALTIMORE, MARYLAND.

MACHINE FOR PRODUCING BOTTLE-SEALING CAPS.

SPECIFICATION forming part of Letters Patent No. 697,489, dated April 15, 1902.

Application filed May 31, 1898. Serial No. 682,114. (No model.)

*To all whom it may concern:*

Be it known that I, ALBERT JONES, of the city of Baltimore and State of Maryland, have invented certain Improvements in Machines for Producing Bottle-Sealing Caps, of which the following is a specification.

This invention relates to a machine for producing a bottle-sealing cap of substantially the same construction as that shown and described in Letters Patent No. 561,792, granted on the 9th day of June, 1896, to Lewis Kalling, to which reference should be made. By reference to the said Letters Patent it will be seen that the sealing-cap therein described embodies as an essential feature thereof a compressible sealing-gasket which is seated in a hollow bead or a groove in the lateral wall of the cap, which gasket after the application of the sealing-cap to the head of the bottle is forced closely in contact with the bottle-head to form a tight joint by flattening the said bead or contracting the portion of the lateral wall in which the gasket is inclosed.

The operation of the machine embodying the present invention is divided into three essential steps—viz., stamping and drawing from a sheet-metal blank strip a cap having an annular enlargement in its lateral wall for the reception of a joint-forming gasket, inserting in the enlarged portion of the cap the end of a compressible sleeve and cutting off the inserted portion which is left in the cap as a gasket, and turning in the edge of the cap over the gasket to hold it in place.

The present invention consists in the combination of a machine or certain parts or elements of a machine, whereby a sealing-cap is stamped out, with mechanism for inserting an annular gasket in the cap and devices to turn in the edge of the cap upon the inclosed gasket to hold it in place, as will hereinafter fully appear.

In the further description of the said invention which follows reference is made to the accompanying drawings, forming a part hereof, and in which—

Figure 2:
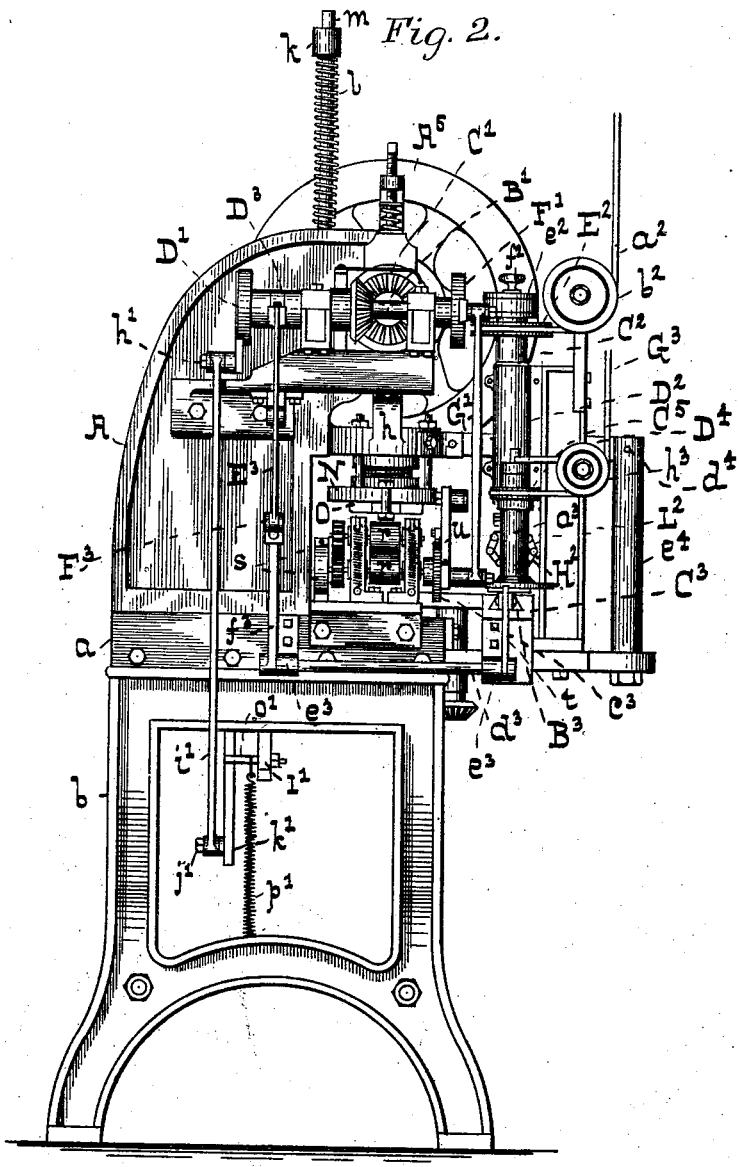
Figure 3:
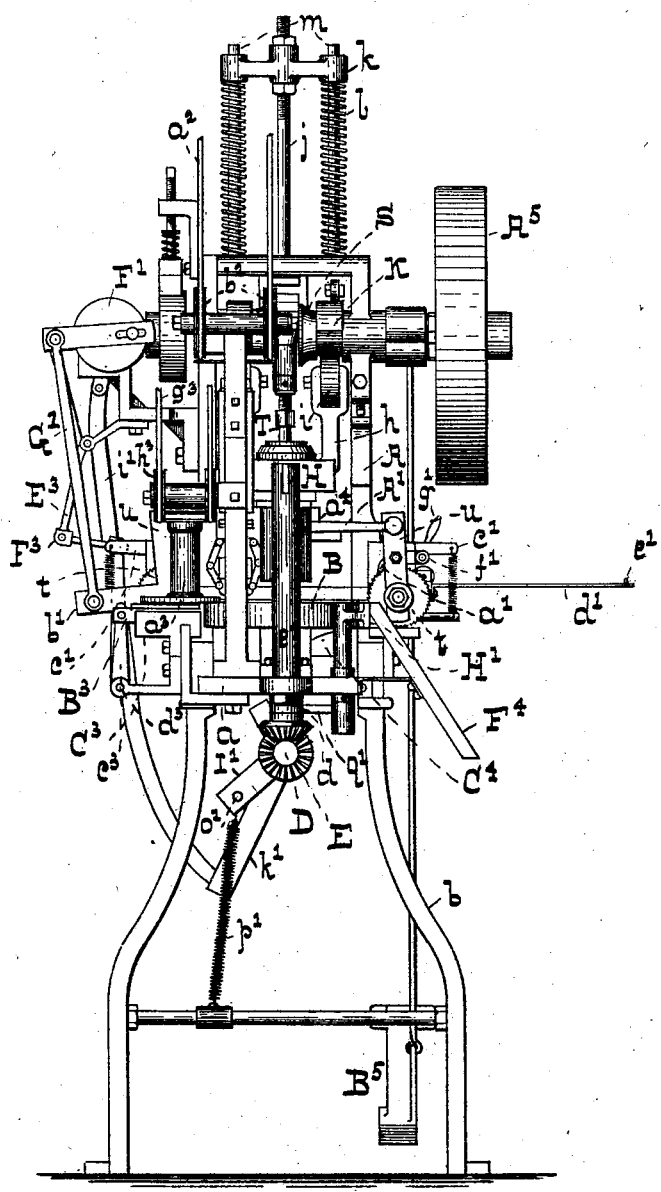

Figure 1 is an exterior view of the improved machine as seen from the side to which are fed the tin-plate blank strips from which the caps are formed. Fig. 2 is a side view the reverse of Fig. 1. Fig. 3 is an exterior front view of the machine. Fig. 4 is a top of plan view. Fig. 5 is an enlarged partially-sectional view of certain parts of the mechanism whereby circular blanks are punched from a sheet-metal strip and drawn into unfinished sealing-caps. Fig. 6 is an under side view of the punch, the upper die, and its immediate attachments, shown in Fig. 5. Fig. 7 is an enlarged partially-sectional view of the principal parts of the mechanism for inserting rubber gaskets into the unfinished sealing-caps. Fig. 8 is a section of Fig. 7, taken on the dotted line $xx$. Fig. 9 is a still further enlarged sectional view of certain parts shown in Figs. 7 and 8. Fig. 10 is an enlarged sectional view of the revoluble table and the mechanism whereby the same is intermittingly rotated. Fig. 11 is a transverse section of Fig. 9. Fig. 12 is an enlarged sectional view of the vertical plunger shown particularly in Fig. 5 and certain of its attachments. Fig. 13 is a sectional plan of certain parts of Fig. 4. Fig. 14 is an exterior top view of certain parts shown in Fig. 13. Fig. 15 is a cross-section of Fig. 14. Fig. 16 is a partially-sectional elevation of the rolls for feeding the sheet-metal blank strip to the cap punching and drawing devices, which are also shown. Fig. 17 is a sectional view of a sealing-cap with the joint-forming gasket therein and before the edge of the metal is turned in to secure the gasket. Fig. 18 is a similar view of the cap, showing the same with its edge turned in and upon the gasket. Fig. 19 is a flat view of a sheet-metal blank strip after the cap-blanks have been stamped from it and which constitutes the waste.

Referring now to the drawings, A is the frame of the machine, resting on the bed-plate $a$, which is supported by the legs $b$.

B is a revoluble table keyed to the upper end of the central vertical shaft C, which is supported in a bearing $d$, projecting from the bed-plate $a$. The central boss of the bearing $d$ is shown on an enlarged scale in Fig. 10. The shaft C is driven from the horizontal shaft D by means of the miter gear-wheels E, and the said shaft, which is supported by hangers $e$, (see Fig. 10,) is actuated from the main driving-shaft F, as hereinafter described. In the table B and near to its circumference are eight holes $f$ at a common distance apart, and in each hole is a liftable die $g$, the lower and smaller portion of which extends through the table, as shown in Figs. 5 and 10. The upper surface of the die $g$ is concave and has the same configuration as that of the crown of the sealing-cap to be made.

H is a head (see Fig. 5) projecting from a block I, adapted to have a sliding vertical movement between two adjustable gibs J, secured to the face of the frame A. From the head H project two vertical standards $h$, carrying rollers $i$, which are held yieldingly in contact with the outside of cams K on the driving-shaft F by means of springs $l$, which are coiled about stationary rods $m$, leading from the top of the frame and passing through the eyes of a cross-head $k$, attached to the top of a rod $j$, which projects from the block I. The center of the head H is directly over the path described by the holes in the table when the table is revolved, as shown in Fig. 5.

L is a sleeve in two parts (see Fig. 5) screwed into the head H, and M a plunger arranged to slide in the sleeve. Over the lower end of the sleeve L is screwed a collar N, which is further supported from the head H by bolts $n$, as shown in Figs. 2 and 5. To the lower side of the collar N is fastened by means of bolts $o$ a central boss O, carrying the punch P, which, in connection with the die Q, situated over the table B, (see Figs. 5 and 16,) cuts from a strip of sheet metal the circular blanks from which sealing-caps are formed. A sectional view of the sealing-cap is shown in Figs. 17 and 18, in which they are denoted by Z.

R is the upper cylindrical die, the face of which corresponds in shape with the concave or inner surface of the sealing-cap. It is attached to the plunger M and slides within the central boss O. The die R has a spring-held plunger $p$, which holds the blank until the die comes in contact with it at the beginning of the drawing or stamping operation. The plunger M and its die R are operated from the driving-shaft F through the medium of the crank S and the connecting-rod T. (See Figs. 3 and 5.)

The die Q, which cuts out the circular blank, is secured to a plate U, (see Figs. 5 and 16,) which extends transversely of the machine, and in the said plate is the intermediate die V, which cuts the blank.

The blanks are punched from a strip of tin-plate, (see Fig. 19,) which is fed across the machine and between the dies before described, and it passes through a channel $q$, (see Figs. 5 and 16,) the sides of which form a lateral guide for it. To feed the tin-plate blank strip I apply to each side of the machine a pair of rolls $r$, the shafts of each pair of which are connected by spur gear-wheels $s$.

The lower shaft in each pair of rolls is provided with a tight ratchet-wheel $t$ and a loose arm $u$, carrying a pawl $a'$, which is in gear with the teeth of the ratchet-wheel. These arms are connected by a rod A' to effect their joint action, and one of the said arms is provided with a branch arm $b'$, whereby it is operated, as hereinafter described. The upper roll of each pair is liftable, and it is held down by means of two spring-held levers $c'$. From the stand of one set of feed-rolls extends the tin-plate blank-strip support $d'$, which consists of a bar with a stop $e'$ at a proper distance from the center of the machine. The spring-held levers of the first rolls or those next to the strip-support $d'$ may be raised by cams $f'$, upon which they rest, and the actuating-handle $g'$. The object of this lifting movement of the roll is to allow of the tin-plate blank strip being placed in position on its support $d'$, with one end resting against the stop $e'$.

The means for intermittingly rotating the table B, so as to bring the holes $f$, with their dies $g$, successively under the punch P, consist as follows:

B' is a counter-shaft, properly supported in bearing-boxes, driven from the driving-shaft F through the medium of the miter-gear C'. At one end of the counter-shaft B' is a crank-disk D', the pin $h'$ of which is connected by a link $i'$ to a similar pin $j'$ on an arm $k'$, which is loose on the shaft D before described. The arm $k'$ has a cross-arm $l'$, carrying a pivoted pawl $m'$, which engages with the teeth of a ratchet-wheel E', which is tight on the shaft D. From this description it will be seen that at each revolution of the counter-shaft B' the shaft D has imparted to it a portion of a revolution, and the movement effected is such as will revolve the table a distance equal to that between the holes therein. The movement of the feed-rolls $r$ is also derived from the counter-shaft B' through the medium of the crank-disk F' and a link G', which unites the pin of the crank-disk F' to a similar pin on the branch arm $b'$.

While the devices described for actuating the table are of such character as to move it at each revolution of the driving-shaft a distance equal to that between the holes $f$ only, it is necessary in practice to supply devices to prevent the table from passing beyond the stopping-point by reason of its momentum. Such mechanism preferably consists of a spring-held pawl H', adapted to enter any one of eight notches $n'$ in the circumference of the table. On the shaft D is a cross-lever I', one arm of which has a pin $o'$ yieldingly held down by a coiled spring $p'$, and the other arm is connected by a link $q'$ to an arm $r'$ on the shaft $s'$, to which the pawl is secured. The movement which withdraws the pawl H' from a notch in the table is effected by the arm $k'$ striking the pin $o'$. This movement takes place immediately before the time for the operation of the table, and the pawl is allowed to spring back against the circumference of the table, so as to be in position to enter the next notch when the next hole is directly under the die P.

$A^2$ is a sleeve of rubber (see Figs. 9 and 11), which has to be cut into short lengths to form gaskets within the sealing-caps made by the dies before described. This rubber sleeve is placed on a mandrel $B^2$, which it fits tightly, and the whole is inserted in a tube $C^2$, which is free to revolve in a bracket $D^2$, supported from the bed-plate $a$. The upper end of the tube $C^2$ is provided with a loose grooved sheave $E^2$, driven by a round belt $a^2$, which passes around the directing-sheaves $b^2$. On the upper surface of the sheave $E^2$ is a pin $c^2$, and at the top of the tube $C^2$ is a tight collar $F^2$, having a spring-held pin $d^2$, which in its normal position is clear of the pin $c^2$; but when the pin $d^2$ is depressed it engages with the pin $c^2$ and serves to drive the tube $C^2$ when the sheave $E^2$ is revolved. The mandrel $B^2$ has a flange $e^2$ at its upper end and a knob $f^2$, whereby it is lifted for the purpose of placing on it the rubber sleeve. The flange $e^2$ has a hole through which the reduced upper end of the pin $d^2$ passes to depress the said pin into contact with the one $c^2$ and at the same time the pin $d^2$ drives the mandrel $B^2$ through the medium of its flange $e^2$. The lower portion of the tube $C^2$ has four radial slots $G^2$, in which are placed the ends of bent levers $H^2$, pivoted to lugs $I^2$, projecting from a hollow collar $J^2$. (See Figs. 7 and 9.) This hollow collar is packed with some soft material, such as wicking, to increase the friction between it and the tube. A gland $g^2$ is used to compress the packing.

$K^2$ is a flanged collar loose on the tube $C^2$ and situated a short distance above the packed collar $J^2$, having lugs $h^2$, which are united to the upper end of the levers $H^2$ by links $L^2$. It will be understood that by moving down the flanged collar $K^2$ the lower ends of the levers $H^2$ are forced inward and against the rubber sleeve $A^2$ on its mandrel $B^2$.

The lower end of the mandrel $B^2$ is bored so as to form a cavity, from which extend four radial slots $i^2$.

$M^2$ is a bolt screwed into the mandrel $B^2$ from the bottom, whose head $j^2$ forms a cap to cover the central cavity and the radial slots $i^2$. (See Fig. 9.)

$N^2$ is a sliding block consisting of a cylindrical body with radial wings which fit the cavity and the radial slots in the lower end of the mandrel, and it is bored so as to slide on the bolt $M^2$. The circumferential face of the wings of the sliding block extends to the circumference of the mandrel, so as to come in contact with the inner surface of the rubber sleeve $A^2$. The length of the sliding block $N^2$ is considerably less than that of the slots $i^2$, as shown in Fig. 9. Consequently the said block may be moved longitudinally of the mandrel. A spring $O^2$, coiled about the bolt $M^2$, serves to yieldingly retain the sliding block in its highest position, as shown in Fig. 9.

From the foregoing description it will be seen that should the flanged collar $K^2$ be moved downward the lower ends of the levers $H^2$ are first forced inward so as to clamp the rubber sleeve $A^2$ against the face of the radial wings of the sliding block $N^2$, and in a further or continued movement of the said collar the clamped rubber sleeve $A^2$ is carried along or longitudinally of the mandrel and of the tube $C^2$, which is in revolution so as to reduce the friction between it and the said rubber sleeve. In the return movement of the collar $K^2$ the rubber sleeve is first released by the withdrawal of the levers $H^2$ from contact with its exterior surface, and the sliding block $N^2$ springs back to its original elevated position independently of the sleeve. In the operation of the machine the rubber sleeve at each revolution of the machine is pushed through the tube $C^2$ and into a cap a distance equal to the length of a gasket, and when such operation is performed the portion of the rubber sleeve—that is to say, the gasket—is cut off. The means for cutting off the gasket consists of a revoluble circular knife $A^3$ on a hollow mandrel $a^3$, which is revolved about a stem $b^3$, projecting upward from a carriage $B^3$. This carriage slides within a bracket $C^3$, secured to the bed-plate $a$. (See Figs. 2, 3, 13, 14, and 15.) It is of course necessary that the circular knife should at each revolution of the machine be moved into contact with the rubber sleeve, and for this purpose the carriage $B^3$ is pivoted to the end of the lever $c^3$ on a shaft $d^3$, supported in bearings $e^3$, projecting from the side of the frame A, as shown in Fig. 2. The shaft $d^3$ is provided with another arm $f^3$, which is vibrated from a cam $D^3$ on the counter-shaft $B'$ through the medium of the cam-lever $E^3$ and the link $F^3$. The hollow mandrel $a^3$ of the circular knife has a grooved pulley $C^5$, driven by a belt $G^3$, which runs over the directing-pulleys $h^3$. (See Figs. 2, 3, and 4.)

It will be understood that the cam $D^3$ moves the carriage $B^3$ in the direction which it takes to bring the circular knife in contact with the rubber sleeve $A^2$ to cut the gasket therefrom. The reverse movement of the carriage and knife is effected by the springs $H^3$, which are placed in cavities in the carriage with their outer ends bearing against the plate $j^3$, secured to the bracket $C^3$. (See Figs. 14 and 15.)

$A^4$ is a vertical plunger arranged to slide in a socket $a^4$, secured to the bed of the machine and directly over the liftable die next to the one under the tube $C^2$, carrying the rubber sleeve. The lower end of this plunger is adapted to be pressed onto the sealing-cap after it has been provided with a gasket to turn in its edge over the gasket. To fit it for this purpose, the portion of its surface directly over the vertical edge of the sealing-cap is made beveled (see Fig. 12) and the plunger has an inner spring-held plunger $B^4$, having independent spring-held stems $b^4$. These stems first come in contact with the sealing-cap and serve to hold it in place on the liftable die until the plunger $B^4$ descends to the bottom of the cap, where it remains until the plunger $A^4$ comes in contact with the edge of the cap and turns it over the rubber gasket. The spring-held stems $b^4$ also serve to hold the cap down while the inner plunger $B^4$ is withdrawn; otherwise the cap would rise with the plunger. The plunger $A^4$ is operated from the head H by means of a lever $D^4$, pivoted to the plunger and fulcrumed at $d^4$ to a standard $e^4$, secured to the bed. At the close of this edge-turning operation the sealing-cap is a completed device ready to be discharged from the liftable die, upon which it is still seated, and to make this possible the said die has to be raised, so that its upper edge will be flush with the top of the table. To effect this lifting of the die, there is fastened to the bed an inclined track $C^4$, along which the lower end of the liftable die traverses. This is shown in Fig. 3.

$E^4$ is a deflector to push the finished sealing-cap from its die to a chute $F^4$, leading to any receptacle.

The means for effecting the up-and-down movement of the flanged collar $K^2$, together with the levers $H^2$ and the links $L^2$, consist of a ring $I^4$, placed loosely around the collar and above its flange or between the flange and the nut $j^4$, connected at one side to the plunger $A^4$ by means of a plate $J^4$, and in order that the motion of the flanged collar may be regulated to produce a proper feed of the rubber sleeve the upper end of the plate $J^4$ is slotted, and the connection between the said plate and the plunger $A^4$ is formed by a screw $I^4$, which passes through the said slot. (See Fig. 8, which shows a top view of the upper end of the plate $J^4$ and its attachments.)

$A^5$ is the driving-pulley and balance-wheel, loose on the driving-shaft F, and an ordinary clutch mechanism is employed between the driving-pulley and the said shaft to start and stop the machine through the medium of a treadle $B^5$.

Supposing the machine to be in operation, with a rubber sleeve in position on the mandrel, forming a part of the sleeve-feeding mechanism, and a tin-plate blank strip in place on the supporting-bar, at each movement of the table a circular blank is punched out and formed into an unfinished sealing-cap. As the unfinished caps pass around they are each in succession provided with a gasket and subsequently have their edges turned in to secure the gasket in place. These essential steps or operations are taking place simultaneously, so that at each revolution of the driving-shaft a completed sealing-cap is thrown out.

I do not confine myself to the employment of the mechanism herein shown and described for forming the unfinished caps or that for turning in the edge of the cap upon the rubber gasket, as other devices could be employed to effect a like result.

I claim as my invention—

1. In a machine for producing sealing-caps for bottles, mechanism for forming from a sheet-metal blank an unfinished cap, combined with devices to feed into the said unfinished cap, the end of a flexible sleeve, and to cut off the introduced portion so as to leave in the said cap a joint-forming gasket, and other mechanism to turn in the edge of the cap upon the inclosed gasket, substantially as specified.

2. In a machine for producing sealing-caps for bottles, mechanism to form from a sheet-metal blank an unfinished cap, devices to feed a flexible sleeve along a mandrel and into the said cap, and to cut off the introduced portion so as to provide the cap with a joint-forming gasket, and mechanism to turn in the edge of the cap upon the inclosed gasket, substantially as specified.

3. As means to feed into a sealing-cap, the lower end of a flexible sleeve, a mandrel upon which the said sleeve is placed, and devices substantially as described, to clamp the said sleeve and feed it down independently of the inclosed mandrel, substantially as specified.

4. As means to feed the lower end of a flexible sleeve into a sealing-cap and cut off the introduced portion to form in the cap a joint-forming gasket, the combination of a revoluble mandrel upon which the sleeve is placed, a vertically-sliding block at the lower end of the mandrel, portions of which block extend to the circumference of the mandrel, downwardly-moving levers arranged to clamp the flexible sleeve against the exposed portions of the sliding block, mechanism to push down the clamping-levers and through them and the sliding block, the clamped sleeve into the cap, and knife mechanism to cut off the inserted portion of the said sleeve, substantially as specified.

5. In a machine for producing sealing-caps for bottles, mechanism for forming from a sheet-metal blank a cup-shaped device, combined with mechanism to feed into the said cup-shaped device, the end of a flexible sleeve, and mechanism to cut off the introduced portion of the said sleeve and thereby provide the said cup-shaped device with a joint-forming gasket, substantially as specified.

ALBERT JONES.

Witnesses:
WM. T. HOWARD,
DANL. FISHER.